United States Patent [19]
Suggs

[11] 3,948,553
[45] Apr. 6, 1976

[54] METHOD OF HARVESTING TOBACCO AND APPARATUS FOR BULK HANDLING THE HARVESTED TOBACCO

[75] Inventor: Charles W. Suggs, Raleigh, N.C.
[73] Assignee: ACHS, Raleigh, N.C.
[22] Filed: Dec. 4, 1974
[21] Appl. No.: 529,490

Related U.S. Application Data
[63] Continuation-in-part of Ser. No. 506,265, Sept. 16, 1974.

[52] U.S. Cl. .................................. 294/5.5; 214/5.5
[51] Int. Cl.² ........................................... A24B 1/10
[58] Field of Search .............. 56/1, 27.5; 131/140 R; 61/34; 294/5.5; 211/59, 124, 125; 214/5.5, 16 B

[56] References Cited
UNITED STATES PATENTS

| | | | |
|---|---|---|---|
| 3,105,713 | 10/1963 | Hassler | 294/5.5 |
| 3,244,445 | 4/1966 | Wilson | 294/5.5 |
| 3,807,782 | 4/1974 | Taylor et al. | 294/5.5 |

*Primary Examiner*—James B. Marbert
*Attorney, Agent, or Firm*—Larry L. Coats

[57] ABSTRACT

The present invention relates to a method of harvesting tobacco and system for bulk handling whole leaf flue cured tobacco between field harvesting and curing and drying operations. In the method of harvesting tobacco, tobacco leaves are defoliated from tobacco stalks and conveyed therefrom to an area of discharge where the leaves are discharged and directed in random alignment into an open top bulk tobacco support unit such that the randomly aligned leaves are generally uniformly distributed within a bulk support unit and the tobacco leaves are generally disposed in horizontal planes with the individual leaves being disposed in overlying relationship. After the bulk support unit has been filled to a predetermined level, a plurality of elongated members are inserted through the bulk support unit in directions generally perpendicularly to the planes of the tobacco leaves. Thereafter, the filled bulk support unit is rotated approximately 90° such that the planes of the leaves within the bulk support unit are rotated from generally horizontal positions to generally vertical positions and wherein said bulk support unit includes a continuous volume of leaves with the depth of the volume being greater than the length of the respective leaves comprising the volume. After rotation, the bulk support unit is transferred into operative relationship with a curing and drying system, the bulk support unit being positioned such that the planes of the leaves are generally vertically oriented so as to enable a forced system of air normally associated with a curing and drying system to readily move therethrough.

Basically the apparatus or bulk handling unit supporting the harvested tobacco comprises a rectangular frame structure that when disposed in the filling position includes a leaf receiving area of substantial cross sectional area, both the length and width of the cross sectional area being greater than the length of the respective leaves received within the bulk support unit. For confining the volume of tobacco within the bulk handling or support unit, there is provided a plurality of tines that are adapted to project through the bulk support unit and to support portions of the volume of bulk tobacco within the unit when the support unit is rotated approximately 90° from the horizontal filling position to a vertical position. Therefore, it is appreciated that once rotated, because of the substantial cross sectional filling area, that the vertical depth of the bulk support unit is greater than the length of the respective leaves comprising the volume.

17 Claims, 19 Drawing Figures

METHOD OF HARVESTING TOBACCO AND APPARATUS FOR BULK HANDLING THE HARVESTED TOBACCO

This is a continuation-in-part of U.S. patent application Ser. No. 506,265, filed Sept. 16, 1974, and entitled "METHOD AND APPARATUS FOR BULK HANDLING TOBACCO BETWEEN FIELD HARVESTING AND CURING AND DRYING OPERATIONS".

The present invention relates to a method of harvesting tobacco, and to a system for bulk handling tobacco between field harvesting and curing and drying operations.

Basically the bulk support or handling unit is designed to directly receive a continuous volume of randomly aligned leaves with the plane of the leaves being generally horizontally disposed in overlying relationship. After the handling unit has been filled to a selected level, the leaves therein are suitably confined within said bulk handling unit, and the handling unit is rotated approximately 90° to where the plane of the leaves assume generally vertical positions while remaining randomly aligned, and the depth of the volume of leaves contained within the bulk handling or support unit, as vertically oriented, being greater than the length of the individual leaves comprising the volume. The rotated bulk handling or support unit is suitably adapted to be directly placed into operative relationship with a bulk curing and drying system for curing and drying the bulk volume of tobacco leaves held within said bulk handling unit.

In addition the present invention relates to an improved curing and drying system having a plurality of individual bulk tobacco support units, each unit, as vertically oriented within the curing and drying system, adapted to contain and support a continuous volume of tobacco leaves with the plane of the individual leaves being generally vertically disposed and in random alignment and wherein the continuous volume is of a greater depth (depth meaning the vertical height) than the length of the leaves making up the volume.

BACKGROUND OF THE INVENTION

F. J. Hassler disclosed in U.S. Pat. No. 3,110,326 a method and barn structure for bulk curing and drying whole leaf flue-cured tobacco. Prior to Hassler's bulk curing system, the "stick barn" represented the state of the art of curing and drying flue-cured tobacco. Generally, in the old stick barn system the tobacco leaves were looped onto opposite sides of an elongated stick in small bundles (usually 2 to 3 leaves per bundle) with the bundles being disposed in spaced apart relationship. Hassler discovered that tobacco leaves could be racked and cured and dried in bulk form by peripherally confining an assembled volume of aligned leaves about the stalk or butt end of the leaves making up the bulk volume, as illustrated in FIGS. 3 and 7 of U.S. Pat. No. 3,110,326. The rack illustrated is known as a conventional bulk tobacco rack and is particularly characterized in that it is a single tier rack, i.e., the volume of bulk leaves supported has a depth (or height) of one leaf length when disposed within the curing and drying structure.

Typically in loading a rack of the type disclosed in the Hassler patent, harvested tobacco leaves are transported from the field in a trailer or other suitable transport device and the leaves are transferred manually therefrom to a bin or form supporting a base portion of the single tier rack. The bin or form enables the tobacco leaves to be neatly aligned with the stalk or butt ends of the leaves lying in substantially the same plane. Once a selected volume of leaves have been manually aligned within the bin or form, a series of tines are inserted through the bulk volume of tobacco leaves and the frame carrying the tines is fastened to the base portion thereof. There-after the rack is removed from the bin or form and placed within a curing and drying structure where the walls thereof directly support parallel tier rails which in turn support the rack at any one of several tier levels.

Basically commercial bulk curing systems of today remain fundamentally unchanged over the basic Hassler design, and have over the past years been used for the most part to cure and dry manually harvested tobacco. But in the last several years, automatic tobacco harvesters (of the type shown in U.S. Pat. No. 3,507,103) have begun to meet with substantial commercial success and many farmers are now using such automatic harvesters which have the capacity to harvest 4000 to 8000 lbs of tobacco per hour. This range of capacity is significantly greater than that typically found in manual harvesting operations. With the present system of bulk handling it is diffucult, if at all possible in certain situations, to transfer the tobacco automatically harvested into the curing and drying system as fast as it is harvested. Where the harvested tobacco cannot be transported and properly placed within curing and drying structures at a rate comparable to the harvesting rate, one is likely to find that this idles the harvester at times and may even seriously decrease the total harvesting capacity of the harvester which may be critical in certain farm operations.

Moreover, the scarcity of farm labor has been a major factor in tobacco farmers converting to bulk curing and drying systems and to the use of fully automatic harvesters. While such automatic tobacco harvesters and bulk curing and drying systems have substantially reduced the total labor force required to harvest a given quantity of tobacco, there still remains a significant labor requirement in handling the harvested tobacco between the field harvesting and curing and drying operations, particularly in view of the fact that the leaves are manually handled and retransferred. Thus, the manual handling of the leaves at some stage of leaf handling between field harvesting and curing and drying still requires a significant amount of farm labor relative to the availability of farm labor today. In addition, the manual handling and retransfer of leaves does result in leaf damage—and consequently adversely affects, to at least some degree, the final quality of the tobacco.

SUMMARY OF THE INVENTION

The present invention basically relates to a method of harvesting tobacco, and apparatus for bulk handling tobacco between field harvesting and curing and drying operations in which one single bulk handling or support unit is utilized to receive tobacco leaf material at a harvesting site and wherein the leaves received remain in the same bulk handling unit during transport to the curing and drying site. Once transferred to the curing and drying site, the same bulk handling or support unit is properly oriented and placed in a drying structure for curing and drying the tobacco leaf material confined therein. Thus, the method and apparatus of the present invention for handling tobacco completely eliminates manual handling and retransfer of the tobacco leaf material between harvesting and curing and drying operations.

More specifically, in what is termed the horizontal position, the bulk handling unit is adapted during the harvesting operation to receive randomly aligned tobacco leaf material with the plane of the tobacco leaf materials being generally horizontally disposed in overlying relationship. After the bulk handling unit has been filled to a selected level, the handling unit is transported to a drying structure. At some point in time prior to being placed into operative relationship with the drying structure, the tobacco leaf material within said bulk handling unit is confined therein and the bulk handling unit is rotated approximately 90° to what is referred to as a vertical position. Because the leaves are confined prior to rotation, the position of the individual leaf material remains generally unchanged relative to the surrounding and adjacent leaf material. Therefore, it is appreciated that after rotation and when the bulk handling unit assumes the vertical position, that the leaves therein still remain randomly aligned, while the plane of the leaves now generally extend in vertical directions. Hence, once placed into operative relationship with the particular curing and drying structure, it is appreciated that because of the general vertical orientation of the plane of the tobacco leaf material, that forced air generated by a forced air heating system within a curing and drying structure can readily move vertically through the continuous bulk volume of tobacco leaf material contained within the bulk handling unit.

Unlike the single tier conventional bulk rack, the bulk handling or support unit of the present invention, as vertically positioned within a curing and drying structure, is designed to support a vertically continuous volume of bulk tobacco. The vertical depth of this continuous volume of bulk tobacco is greater than the length of the respective tobacco leaf material comprising the volume and accordingly is greater than the vertical depth of a conventional single tier rack. Thus, the tobacco leaves assume continuous random horizontal levels within the bulk handling or support unit.

It is, therefore, an object of the present invention to provide a method of harvesting tobacco wherein tobacco leaves are defoliated, conveyed and discharged into a bulk handling unit, after which the tobacco is confined within the bulk handling unit and the handling unit is rotated approximately 90° and transferred into operative relationship with a curing and drying system, thus avoiding the necessity for complete retransfer of leaves from a collecting receptacle to a bulk tobacco rack.

Another object of the present invention is to provide a bulk tobacco handling system for efficiently handling tobacco between field harvesting and curing and drying operations.

A further object of the present invention resides in the provision of a method and system of handling bulk tobacco between field harvesting and drying operations in which the manual handling and retransfer of the individual tobacco leaf material is eliminated.

Still a further object of the present invention is to provide a bulk tobacco handling unit that is adapted to both function as a material handling medium in the transfer of tobacco from a field harvesting site to a particular curing and drying site, and in addition to serve as a support for bulk tobacco while being disposed in a drying structure during the curing and drying process.

A further object of the present invention is to provide an improved bulk support unit for use in conjunction with a curing and drying structure wherein the improved bulk support unit is adapted to support a vertically continuous volume of tobacco leaf material within the curing and drying structure in which the planes of the leaves are generally vertically disposed while the individual leaves may be randomly aligned and disposed at various horizontal levels within the bulk support unit.

Still a further object of the present invention is to provide a container like bulk tobacco handling unit for receiving and confining a continuous volume of randomly aligned and spaced tobacco leaves lying in generally parallel planes across the cross sectional area of said bulk handling unit. Expressed in another way the plane of the leaves comprising the volume generally lie in parallel planes, but each individual leaf may be both randomly aligned and randomly spaced within the container like bulk handling unit.

Another object of the present invention resides in the provision of an improved bulk handling and support unit for a curing and drying structure wherein said improved bulk handling and support unit is adapted, when vertically oriented within the curing and drying structure, to support a continuous and integrated volume of vertically spaced tobacco leaves, as opposed to the leaves being supported in single spaced apart transverse tiers.

A further object of the present invention resides in the provision of a bulk tobacco curing and drying system having associated therewith a plurality of container-like bulk tobacco handling and supporting units adapted to be received within said structure in close front-to-back (or side-by-side) engaged relationship, each bulk tobacco handling and supporting unit generally completely surrounding the entire volume of bulk tobacco contained therein even though the bulk handling and support unit may be of at least a partially open construction.

Another object of the present invention is to provide a curing and drying system as recited in the immediate above Paragraph wherein there is provided means cooperable between the individual bulk handling and support units to seal the interface between two closely adjacent units, thereby generally prohibiting the movement of air between the interface of such units.

A further object of the present invention is to provide a bulk handling and support unit having a plurality of elongated members operatively associated therewith for generally uniformly penetrating and extending through random leaf areas of a bulk volume of tobacco contained within said unit wherein said elongated members tend to support portions of the bulk tobacco volume within said bulk handling unit.

Still a further object of the present invention is to more fully integrate tobacco field harvesting and curing and drying operations by providing a bulk tobacco handling unit that is adapted to:

1. directly receive field harvested tobacco from an automatic harvester;
2. confine the received tobacco leaves within said bulk handling unit while being transported to a curing and drying site; and
3. support the bulk tobacco leaves during the curing and drying process, whereby the bulk handling unit is used in field harvesting, transport to a curing and drying site, and in the curing and drying process and generally leaf retransfer between field harvesting and drying and curing operations is not required.

A further object of the present invention resides in the provision of a bulk tobacco curing and drying system having a plurality of bulk handling and supporting units associated therewith and adapted to contain and support a continuous volume of bulk tobacco therein, and wherein the structure of said curing and drying system is adapted to support said bulk handling and support units directly independently of the wall structure thereof.

A further object of the present invention is to provide a bulk tobacco curing and drying system adapted to allow individual bulk tobacco support units to be transferred therein by mobile means and fully independent of any support from the wall structure of the curing and drying system.

Other objects and advantages of the present invention will become apparent from a study of the following description and the accompanying drawings which are merely illustrative of the present invention.

BRIEF DESCRIPTION OF THE DRAWINGS

FIG. 12 illustrating the relative relationship between the two units prior to being placed in close front-to-back relationship, and FIG. 13 showing the two units in close front-to-back relationship so as to define a generally sealed interface therebetween.

FIGS. 14 and 15 are fragmentary perspective views of a latching mechanism of the bulk handling unit used to secure the separable tine assembly to the base portion of the unit, FIG. 14 illustrating the mechanism latched while FIG. 15 shows the mechanism unlatched.

METHOD OF HARVESTING TOBACCO

Figure 1:
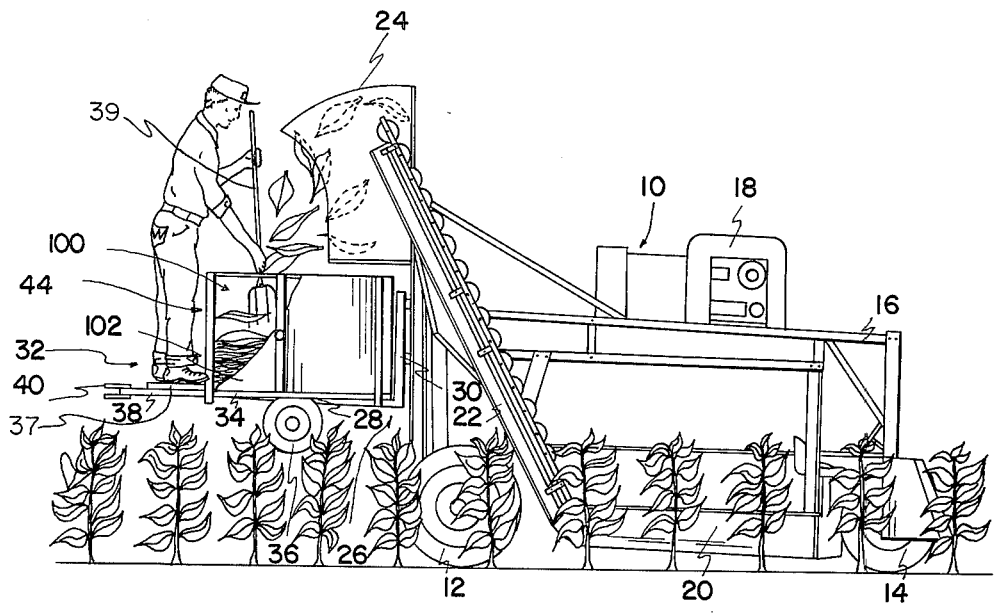
FIG. 1 is a side elevational view of a tobacco harvester supporting the bulk tobacco handling unit of the present invention and an associated trailer in an elevated leaf receiving position.
Figure 2:
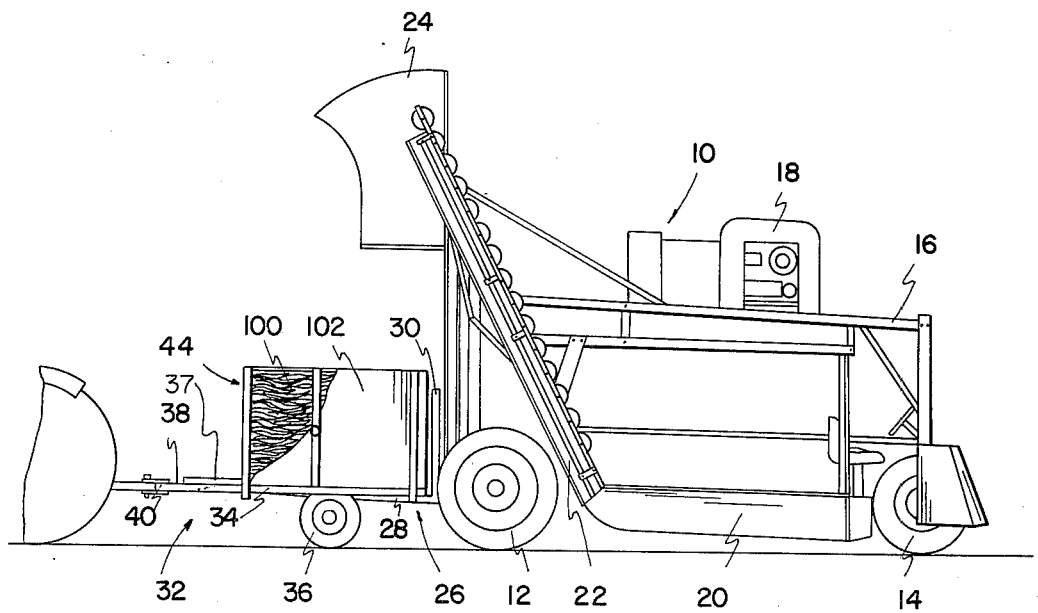
FIG. 2 is a side elevational view of the same tobacco harvester illustrating the bulk handling unit and trailer in a lowered position where the trailer and bulk tobacco handling unit may be removed from the tobacco harvester.

With further reference to the drawings, an automatic tobacco harvester of the high clearance type is shown in FIGS. 1 and 2 and indicated generally by the numeral 10. Details of the tobacco harvester 10 will not be dealt with herein since the basic structure of automatic tobacco harvesters is well known in the art and such is not directly material to the present invention. For a complete and unified understanding and appreciation for a tobacco harvester of the high clearance type, one is referred to the disclosure of U.S. Pat. No. 3,507,103.

In the way of a brief description of the very basic structure of the tobacco harvester 10 it is seen that the same includes a frame structure 16 supported by a pair of rear wheel 12 (only one of which is shown) and a steerable front wheel 14. Mounted atop the frame structure 16 in an engine 18 that is operative to drive and power the various working components found on the tobacco harvester.

The high clearance tobacco harvester 10 is provided with a defoliating unit (not shown but such as that shown in U.S. Pat. No. 2,834,174 or U.S. Pat. No. 3,093,949) that is operative to straddle a row of tobacco and to defoliate leaves from certain levels of the respective stalks of the row as the tobacco harvester 10 traverses the field. The defoliated leaves are conveyed outwardly from each side of the defoliating unit by an associated conveyor mechanism (not shown) where the leaves fall onto a longitudinal side conveyor 20. From the longitudinal side conveyor 20 the leaves are conveyed rearwardly to one of two inclined conveyors 22 which receive the leaves and convey them upwardly and rearwardly therefrom toward a shroud 24 position generally above the upper rear end of the inclined conveyor 22.

Movably mounted for vertical up and down movement about the rear of the tobacco harvester 10 generally under the rear terminal end of the inclined conveyors 22 is a rear trailer lift 26. Rear trailer lift 26 includes a pair of fork fingers 28 and a back structure 30, the back being operatively associated with a vertical guide support unit disposed adjacent a rear portion of the harvester 10 and adapted to move up and down in association therewith.

The rear trailer lift 26 is particularly adapted to engage the lower portion of a trailer 32 and to raise and lower the trailer with respect to the rear terminal end of the inclined conveyors 22. Viewing the trailer 32 in more detail, it is seen that the type of trailer disclosed herein includes a flat bed 34 (which may include retaining sides or post) supported by a pair of wheels 36 (only one of which is shown). Extending from the trailer 32 is a tongue 38 having a platform 37 mounted thereon and a clevis 40 formed on one end thereof and adapted to attach to the drawbar of a tractor 42.

To receive and support the tobacco between field harvesting and curing and drying operations, there is provided a bulk handling or support unit 44 (as illustrated in FIGS. 1-11). From the subsequent discussion to appear herein, it will become apparent that the method of handling the tobacco between field harvesting and curing and drying operations requires that the bulk handling or support unit be rotated approximately 90° at some point between these two operations. To properly perform this rotation phase of handling, it is necessary that the tobacco within the bulk handling or support unit 44 be confined such that during the rotation process the individual leaves comprising the volume of tobacco within the unit 44 are generally held and maintained in the same relative relationship to each other. There very well may be various suitable ways to accomplish this, but the present disclosure contemplates the use of a separable tine assembly 46 which includes a plurality of spaced apart tines or elongated members 46A. Once engaged and secured, the tine assembly 46 becomes a part of the bulk handling or support unit 44.

Shown in FIGS. 3–6 is a conventional forklift indicated generally at 50 and including a forklift carrier assembly 52 movably mounted in association with a vertical support guide structure 54 and adapted to support a bulk tobacco handling unit 44. Details of the forklift will not be discussed herein because the structure thereof is well known and not directly material to the present invention. However, it should be noted that if a forklift is to be used as a part of the bulk handling system of the present invention, it is preferable that the forklift carrier assembly include two forwardly projecting fork fingers having a remote control for laterally adjusting the position of these fingers with respect to each other and with respect to the forklift itself.

Figure 6:
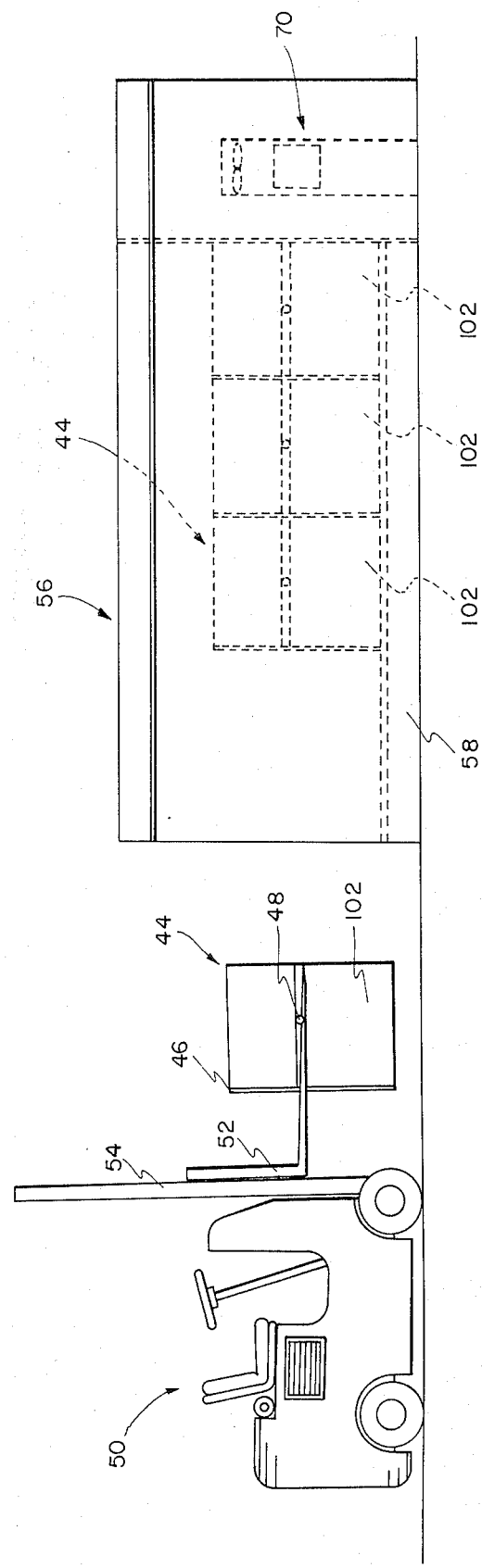
FIG. 6 is a side elevational view illustrating the continuing use of the forklift to directly transport the rotated bulk tobacco handling unit into a curing and drying structure.

Turning to FIG. 6, a bulk curing and drying system is shown therein and includes a curing and drying barn structure indicated generally at 56. Barn 56 will include at least one, and most likely two or three, curing and drying rooms for receiving in succession a series of bulk handling or support units 44. The bulk handling or support units 44 are supported within the barn 56 by a lower support structure that basically includes a pair of laterally spaced, longitudinally extending lower support beams or members 58 that could be constructed of concrete block, wood, metal or any other suitable material. Disposed above each of the lower support members 58 is an angle iron guide 60 that extends generally along the top thereof the entire length of the particular curing and drying room.

As in conventional bulk tobacco curing and drying structures, the barn 56 disclosed herein includes a forced air heating system 70. Such heating systems are well known in the art and, therefore, a comprehensive discussion of such a system and the temperature controls therefor will not be presented herein. For a detailed discussion of bulk curing and drying structures and the controls therefor, one is referred to the basic Hassler patent on bulk curing of tobacco, U.S. Pat. No. 3,110,326.

The above discussion is directed to the field harvesting and curing and drying environments, and to certain material handling implements and equipment used in handling and supporting the bulk tobacco between field harvesting and curing and drying operations. With this background, the method of harvesting the tobacco will be described.

First the bulk handling or support unit 44 (without the tine assembly 46) is placed on the bed 34 of the trailer 32 and the tobacco harvester 10 is positioned with respect to the trailer such that the fork fingers 28 extend directly thereunder. Once properly positioned with respect to each other, the trailer lift 26 of the tobacco harvester 10 is actuated and the trailer 32 and bulk handling unit 44 are raised to an elevated position (FIG. 1). In this position, it will be appreciated that the bulk handling or support unit 44 is opened at the top and adapted to receive tobacco leaves moving over the upper rear terminal edge of the inclined conveyors 22. It should be noted that the harvester 10 could directly engage and support the bulk handling unit 44 independently of a trailer.

As the tobacco harvester 10 traverses the field, tobacco leaves are defoliated from the respective stalks and conveyed via longitudinal conveyors 20 and the incline conveyors 22 upwardly towards the discharge area or shroud 24. As the tobacco leaves move over the upper rear terminal ends of the conveyors 22, the leaves free fall therefrom into the bulk handling and support unit 44. It will be appreciated that the leaves falling from the inclined conveyors 22 will fall into the bulk handling and support unit 44 in random alignment and spaced in random relationship relative to each other. However, it will be observed that the plane of the leaves, i.e., the flat sides of the leaves, will fall into the bulk handling or support unit 44 such that the plane of the leaves will generally be horizontally positioned in overlying relationship, as illustrated in FIGS. 1 and 2. As the leaves are discharged into the support unit 44, a worker stationed on the platform 37 (FIG. 1) with the aid of an implement such as a pitch fork 39 uniformly distributes the leaves within the support unit 44. This part of the method or process may be actually combined with the discharge step such that the leaves are mechanically discharged uniformly into the support unit.

After the bulk handling and support unit has been filled to a predetermined level, the trailer lift 26 is lowered to a position, as shown in FIG. 2, where the wheels 36 thereof engage the ground. At this position, the trailer 32 is coupled to a tractor 42 and the tractor is used to transport the bulk handling unit 44 from the field harvesting site to a curing and drying site.

Figure 10:
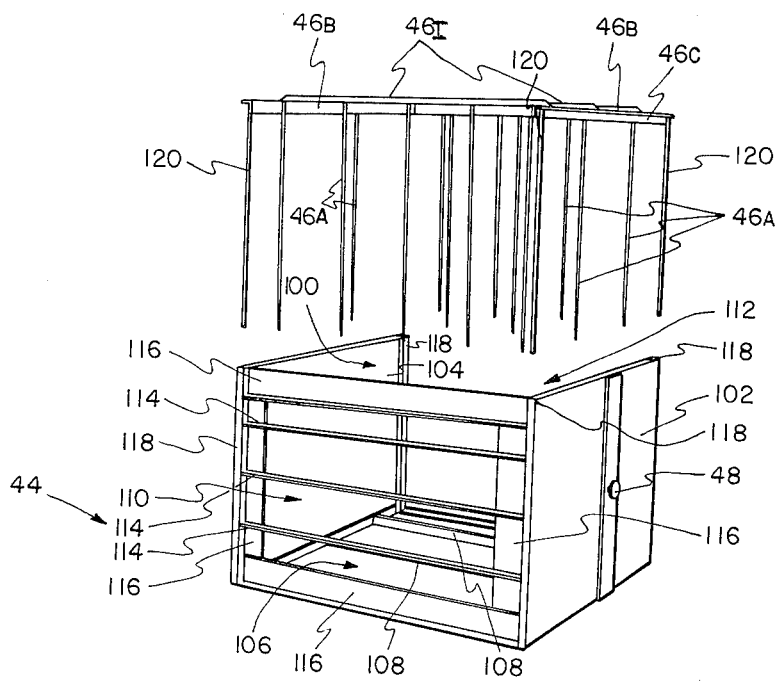
FIG. 10 is a perspective view of the bulk handling or support unit of the present invention with the separable tine assembly shown detached from the base portion of the unit.

At some point prior to being finally positioned within the barn structure 56, it is necessary to rotate the entire bulk handling or support unit 44 approximately 90° to where the planes of the individual leaves contained therein are rotated from their general horizontal positions, as indicated in FIGS. 1 and 2, to vertical positions (FIG. 10). By rotating the unit 44 to a position where the planes of the leaves are generally vertically disposed, the forced system of air associated with the curing and drying structure 56 may readily pass through the volume of bulk tobacco contained herein.

Prior to rotation, however, it is necessary to confine the volume of leaves within the bulk handling or support unit such that upon rotation the leaves are maintained in the same relative relationship with respect to each other. To confine the leaves within the bulk handling and support unit 44, the separable tine assembly 46 is positioned above the bulk handling unit 44 and pressed downwardly through the volume of tobacco within the unit, the tines or elongated members 46A penetrating and extendiing generally through the plane of the leaves (at random points) comprising the volume. It should be pointed out that the tines or elongated members 46A are preferably generally uniformly spaced with respect to the cross sectional area of the bulk handling or support unit 44. Therefore, when locked into position and integrated with the base portions of the bulk handling or support unit 44, one finds that the tines or elongated members 46A directly support certain portions of the volume of tobacco held therein.

Figure 3:
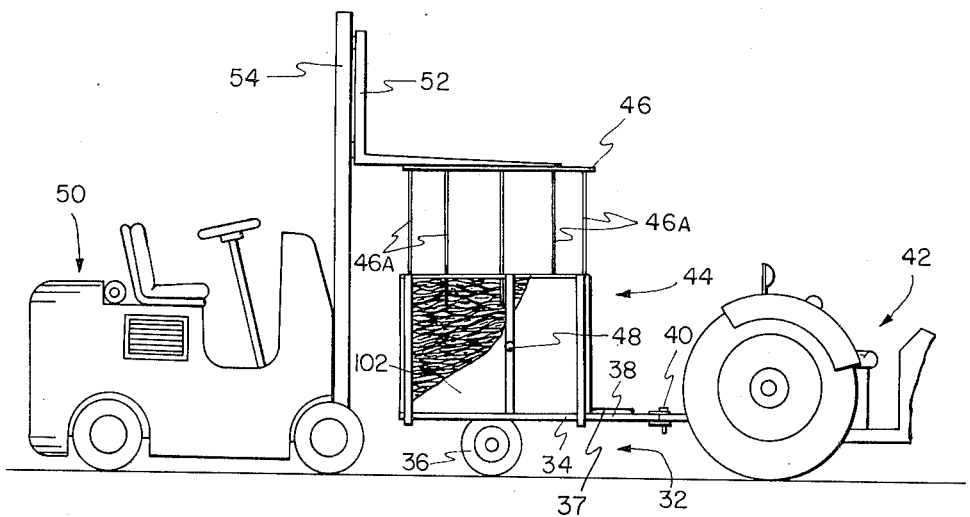
FIG. 3 is a side elevational view showing a forklift pressing the tine assembly of the handling unit into an engaged position with tobacco contained therein.

In FIG. 3, the forklift carrier assembly 52 is shown engaging a top portion of the tine assembly 46 and pressing the same downwardly through the volume of tobacco in the bulk handling or support unit 44. This is an acceptable method of pressing the tines or elongated members 46A into the bulk volume of tobacco, but it should be pointed out that the tine assembly or portions making up the tine assembly could just as well be manually pressed into engagement with the tobacco. Although the present disclosure does suggest the use of the tine assembly 46, it is contemplated that confining of the leaves within the bulk handling or support unit 44 could possibly be accomplished by enclosing a part of the open top area of the unit 44.

Figure 4:
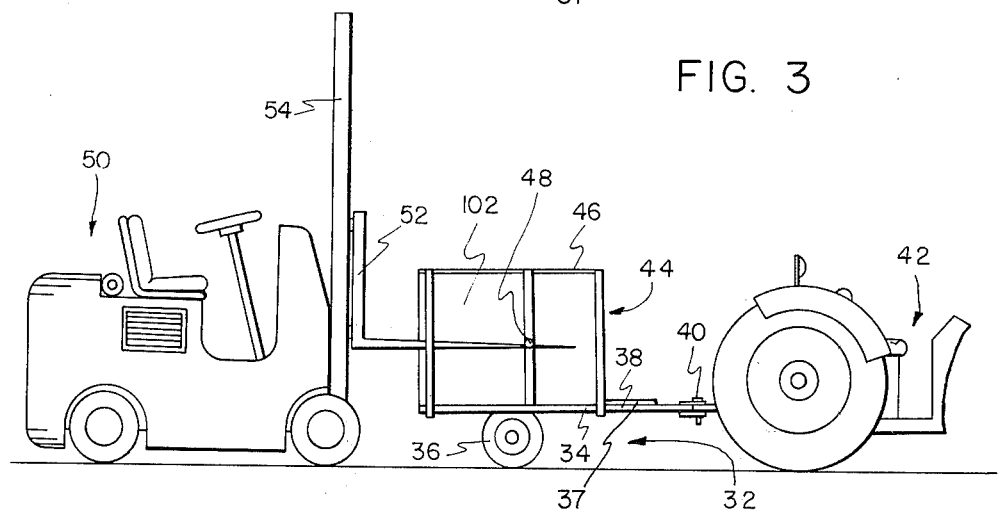
FIG. 4 is a side elevational view of the forklift engaging the bulk handling unit about offset stub axles.
Figure 5:
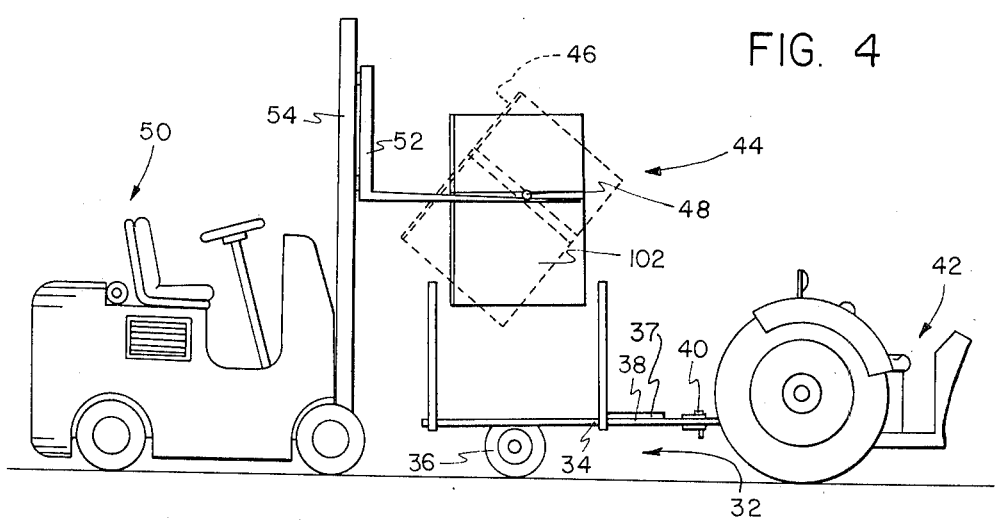
FIG. 5 is a continuational view of FIG. 4 which illustrates the 90° rotation of the bulk handling unit as it is raised from the trailer by the forklift.

After the bulk tobacco has been confined within the bulk handling unit 44, the unit can then be rotated approximately 90° to reorient the plane of the leaves therein. In FIGS. 4 and 5, the fork fingers of the forklift 50 are laterally adjusted such that they align with a pair of stub axle shafts 48 extending outwardly from opposite sides of said bulk handling or support unit 44. The fork fingers are positioned under the stub axle shafts 48 and the forklift carriage assembly 52 is actuated upwardly. Because the stub axle shafts are offset to one side, the lifting of the bulk handling unit 44 results in the same rotating counterclockwise, as viewed in FIGS. 4 and 5, approximately 90°. Because of the particular placement of the offset axle stub shafts 48, the bulk handling or support unit 44 freely and without external influence assumes a 90° rotated position (also referred to as the vertical position) and the plane of the leaves therein assume vertical orientation while the alignment and spacing of the leaves remain random.

Once the bulk handling or support unit 44 has been rotated, the forklift 50 transports the unit directly to the barn structure 56 (FIG. 6). Although once in dose proximity of the barn 56 the unit may be finally positioned within the structure in various suitable ways, the forklift 50 may be driven directly in the structure and the bulk support unit properly positioned therein. Preferably, the forklift operator may rest the bulk support unit 44 within the angle iron guides 60, and then by use of the forks under the support unit push the unit rearwardly into the room until it assumes the proper position adjacent the preceding placed unit.

Other means of positioning the bulk handling or support unit 44 within the barn structure 56 would be: (1) a cable drive within the barn structure to actually pull the bulk support units through the curing and drying room and into proper position therein, or (2) a longitudinally elevated beam within the structure having a chain hoist assembly movably mounted thereon.

Figure 17:
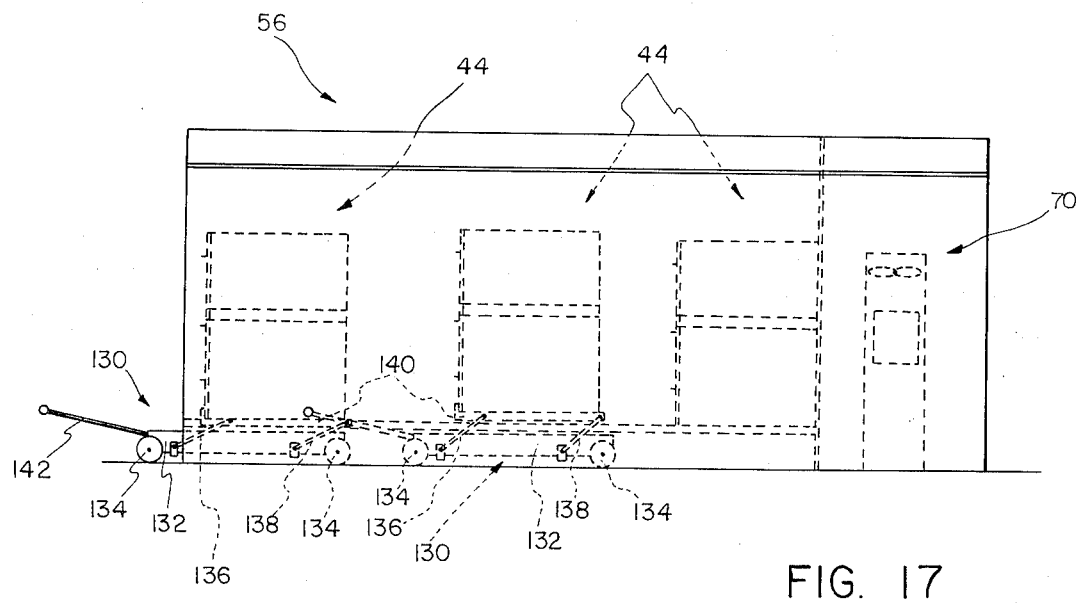
FIG. 17 is a side elevational view of a bulk curing and drying structure having a mobile bulk unit moving means associated therewith, the mobile moving means shown being a hydraulic jack having a vertically movable lifting platform associated therewith.

In addition, there is illustrated in FIG. 17 another method of transporting the bulk handling units 44 within the barn structure itself. This system entails the use of a hydraulic jack 130 having a main frame 132 and front and rear wheels 134 confined within a track structure (not shown) within the barn. The hydraulic jack 130 includes a parallel four-bar linkage made up of a pair of links 136 and 138 and a lift platform 140 operatively connected between the links. A hydraulic cylinder (not shown) is operatively connected to the four-bar linkage for actuating the same.

In the use of such a jack structure, the bulk handling and support unit 44 is placed thereon at the open end or front of the particular curing and drying room. Next, the jack is actuated such that the parallel four-bar linkage causes the platform to lift the bulk handling unit above the level of the support members 58 within the barn 56. The jack is then rolled back (as illustrated in dotted lines in FIG. 17) to a proper position with respect to the preceding placed bulk support unit, and the platform is lowered to where the bulk unit being carried thereby is appropriately supported by the lower support members 58. The jack is then returned to the front of the curing and drying room for receiving the next bulk handling unit 44.

Figure 7:
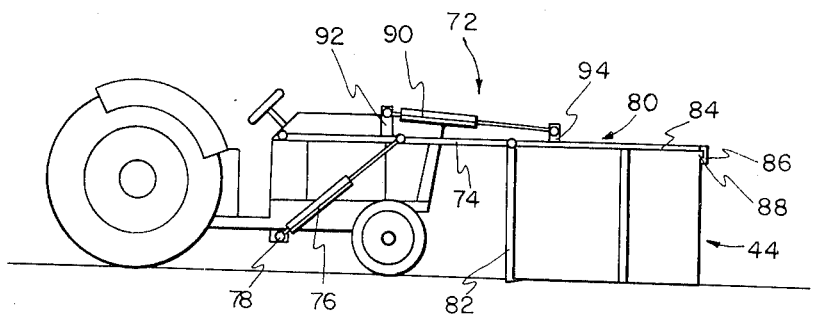
FIGS. 7-9 are sequence views illustrating as an alternate to the forklift, a modified front end loader assembly for engaging lifting, and rotating the bulk handling unit.
Figure 8:
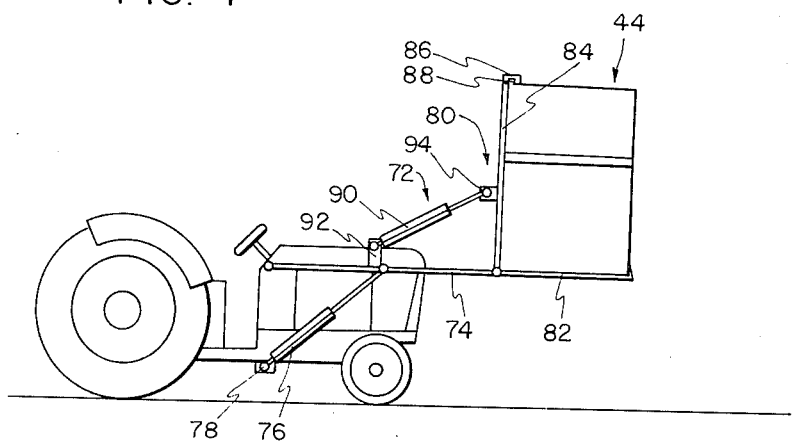
Figure 9:
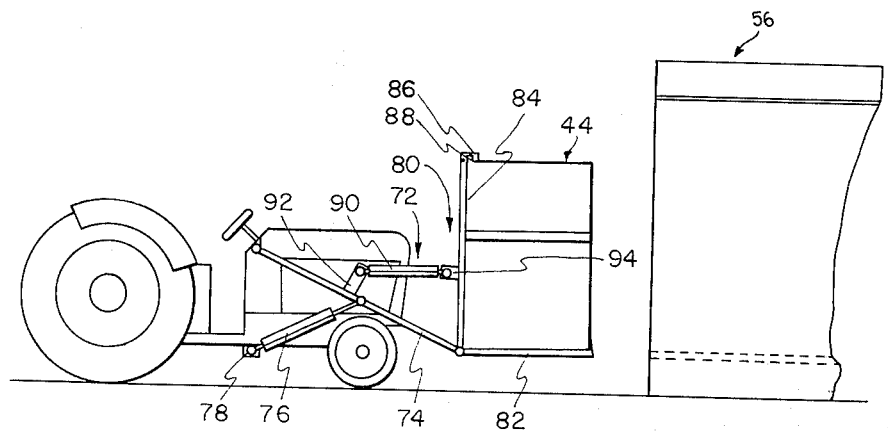

As an alternate to the forklift 50, a tractor adapted modified front end loader, indicated generally at 72, may be used to rotate each bulk handling or support unit 44 and transport the same to or into the barn structure 56 (FIGS. 7–9). Viewing the modified front end lower 72 in greater detail, it is seen that the same is adapted to be supported and operated by a conventional tractor and includes a lift boom structure 74 typically mounted about a transverse axis to the tractor and extending therefrom. The lift boom structure 74 is supported by and actuated by a pair of hydraulic lift cylinders 76, although not particularly shown, each lift cylinder being disposed on a respective side of the tractor and anchored about a pivot point 78. The rod end of each of the lift cylinders 76 is pivotly connected to an intermediate point on the lift boom structure.

Pivotly secured to the forward remote end of the lift boom structure is a L-shaped cradle indicated generally by the numeral 80, the L-shaped cradle being adapted to surround and engage a portiton of the bulk handling or supporting unit 44. Forming a part of the L-shaped cradle 80 is a base leg 82 and a back leg 84. Pivotly mounted to the remote end of the back leg 84 is a generally hooked shaped retainer means 86 that is adapted to encompass and engage a hook receiver means 88 associated with each bulk handling or support unit 44.

Extending generally upwardly from the lift boom structure 74 is a brace 92 that has anchored to the upper end thereof a hydraulic cylinder 90, the rod end of the cylinder being connected to a tab 94 fixed to the back leg 84 of the L-shaped cradle 80.

In rotating and transporting the bulk handling or support unit 44, the tractor is positioned such that the L-shaped cradle 80 engages the bulk handling unit 44 while such is on a trailer or other support structure, as illustrated in full lines in FIG. 7. It is seen that the base leg 82 includes a lip that generally cups around a slight portion of the bottom of the bulk handling unit 44, while the hook shaped retainer means 86 engages and couples with the hook receiver means 88 extending outwardly from the bulk unit 44. Next, the lifting cylinders 76 are actuated such that the rods (or pistons) associated therewith extend outwardly, causing the lift boom structure 74 to rotate counterclockwise, as viewed in FIG. 8, and to lift the bulk handling or support unit 44 from the trailer or other type of support. As the bulk handling unit 44 is raised above the support, the rotating cylinder 90 is actuated so as to retract the piston (or rod) therein, and to generally rotate the entire L-shaped cradle 80 and the held bulk support unit 44 counterclockwise to a vertical position. After achieving the vertical position, the entire bulk handling unit 44 can be lowered to a desired level without changing the vertical orientation and the entire bulk handling or support unit 44 can be transported to or into the barn structure 56 just as in the case of the fork lift 50 previously described (FIG. 9).

It should be pointed out that in the case of this modified front end loader 72, that the structure may preferably be symmetrical on each side of the tractor, and accordingly there would be two laterally spaced lift booms 74, two laterally spaced hydraulic lifts cylinders 76, etc. Also, it would be appreciated that the disclosure of the L-shaped cradle structure 80 is only one particular front end loader designed that would be suitable in this case. There are obviously other designs that would vary in the details from that shown herein but would still embody the same basic inventive principles and concepts of handling the bulk handling unit 44.

THE BULK HANDLING UNIT AND IMPROVED BULK TOBACCO CURING AND DRYING SYSTEM

Figure 11:
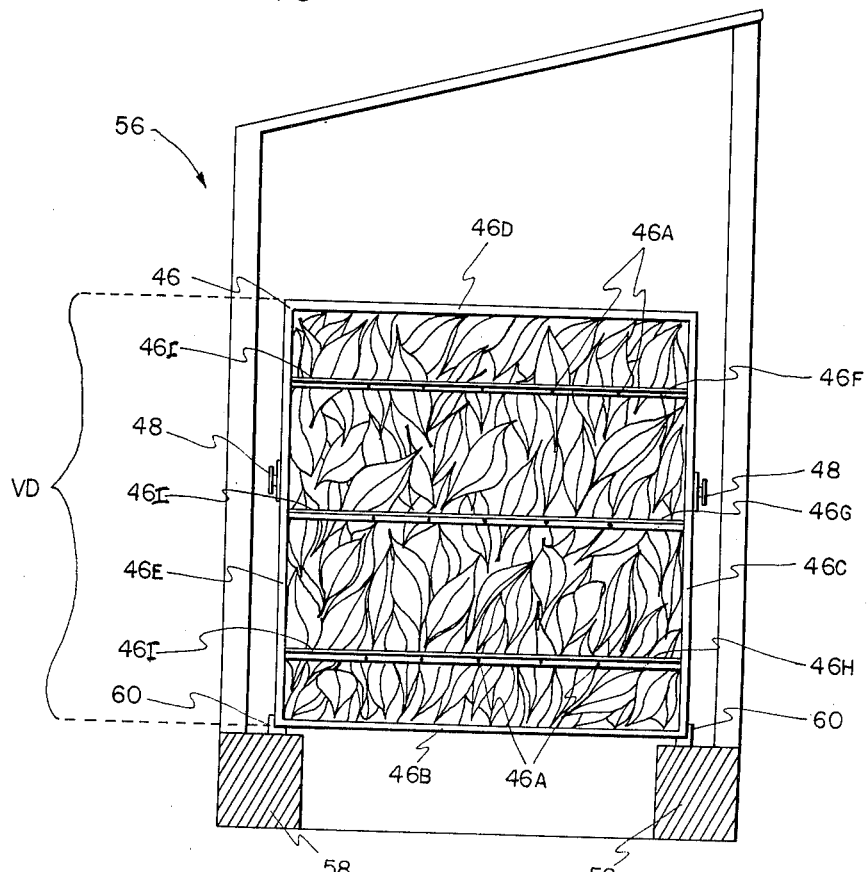
FIG. 11 is a fragmentary sectional view of a single room of a curing and drying structure showing the bulk handling unit supported therein after rotation.

With reference to the drawings, particularly FIGS. 10 and 11, the bulk handling unit 44 is shown therein in greater detail. In FIG. 10, the bulk handling unit 44 is shown therein in the general horizontal or leaf receiving position. Viewing the bulk handling unit 44 in greater detail, it is seen that the same includes a base portion that is generally constructed of a cubical frame and includes a top rectangular open leaf receiving area 100 (of substantial cross sectional area) defined about the top portion thereof. Disposed along each longitudinal side of the base portion of the bulk handling unit 44 is a pair of imperforated sides 102 and 104.

Defined between the imperforated sides 102 and 104 is a partially open bottom 106 that generally corresponds in cross sectional area to the leaf receiving area 100. Extending transversely across the partially open bottom 106 in parallel spaced apart relationship is a series of tine support members 108 that may be constructed of any suitable material including angle iron. The remaining two sides of the base portion of the bulk handling unit 44 are at least partially open and are referred to as lateral sides 110 and 112. As viewed in FIG. 10, the front lateral side 110 includes a plurality of transversely extending retainer or reenforcing bars 114. Also, along the border of the front lateral side 110 is a plurality of border strips 116. The significance of the border strips 116 will become more apparent from the discussion to follow relating to the orientation of the various sides of the bulk handling unit after the same has been rotated 90 degrees and properly placed within the barn structure 56. It should be noted that side 112, which is opposite side 110, is shown as being completely open. To confine the leaves being received by the bulk handling unit 44, the lateral open side 112 could include a series of retainer bars such as those incorporated into the front lateral side 110. In the present case, however, the bulk handling unit 44 is placed on the trailer 36 such that the complete open side 112 is disposed adjacent a front transversely extending side of the trailer, this side functioning to generally confine the leaves within the bulk handling unit 44 and prohibiting the leaves from falling out of the open side 112 thereof.

Turning now to a discussion of the separable tine assembly 46, it is seen that the same basically comprises a rectangular bar frame construction, including four bar members 46B, 46C, 46D and 46E. Extending transversely between members 46C and 46E are a plurality of tine support members 46F, 46G and 46H. The tines or elongated members 46A are affixed to each of these members (46F, 46G and 46H) so as to be supported thereby in cantilever fashion from said tine assembly 46.

To guide the tine assembly 46 into proper engagement with the base portion of the bulk handling unit 44, the tine assembly 46 is provided with a series of corner guide arms 120. To receive the corner guide arms 120, the base portion is provided with guide arm receiving means 118 in the form of open sleeves spaced at the corners. Consequently, to align and properly press the tine assembly 46 downwardly through the bulk volume of tobacco leaves held within the base portion of the bulk handling unit 44, the guide arms 120 are aligned with the sleeves 118 and are inserted therein such that when the tine assembly is pressed downwardly, the guide arms 120 move downwardly into the sleeves 118.

After the tine assembly 46 has been pressed down to where the frame structure thereof engages the top portion of the base portion of the bulk handling unit 44, the tine assembly is coupled to the base portion of the bulk handling unit by a latching mechanism indicated generally by the numeral 122. Viewing the latching mechanism 122 in more detail, it is seen that the same comprises a spring loaded latch 124 pivotably mounted to the tine assembly 46 and having a simple leaf-like spring 128 that biases the latch 124 outwardly to where it normally engages a locking tab 126 extending inwardly from the base portion frame structure of the bulk handling unit 44. Preferably such a latching mechanism 122, as just described, would be properly positioned on at least two opposite sides of the total bulk handling unit 44.

Once the bulk handling unit has been rotated approximately 90° and properly positioned within the bulk barn structure 56 by any of the methods suggested by this disclosure, it is stated for purposes of reference that the bulk handling unit assumes a vertical position where the planes of the leaves are generally vertically oriented. After rotation, it is seen the portion of the bulk handling unit 44 which was formerly the top tine assembly now becomes a front lateral side. The former front lateral side 110 now becomes the bottom while the former open lateral side 112 becomes the top. The imperforated sides 102 and 104 remain the longitudinal sides although they have been rotated 90°.

In the rotated or vertical position just referred to above, the tines 46A extend generally longitudinally with respect to the barn structure 56 and the remote ends thereof generally deflect due to the load of the bulk tobacco within the bulk handling unit 44 to such a degree that the remote ends are supported by the transverse tines support members 108. It is thusly seen that when rotated in the vertical position within the barn structure the tine support members 108 are spaced just below the level of corresponding tine support members 46F, 46G and 46H of the tine assembly 46. This assures that when pressed into the bulk tobacco prior to rotation; that the tines or elongated members 46A do not engage and interfere the back tine support members 108. Also, upon rotation, it is seen that the load carried by the tines or elongated members 46A cause the same to deflect downwardly to where the remote ends are supported by the back tine support members 108.

Figure 12:
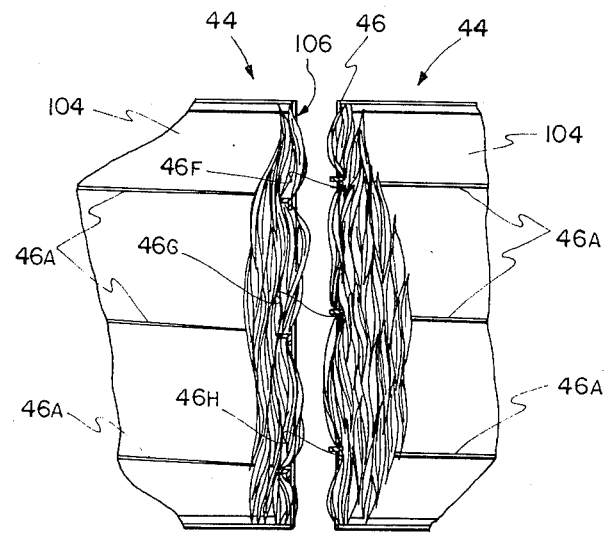
FIGS. 12 and 13 are fragmentary sectional views of portions of two adjacent bulk handling units.
Figure 13:
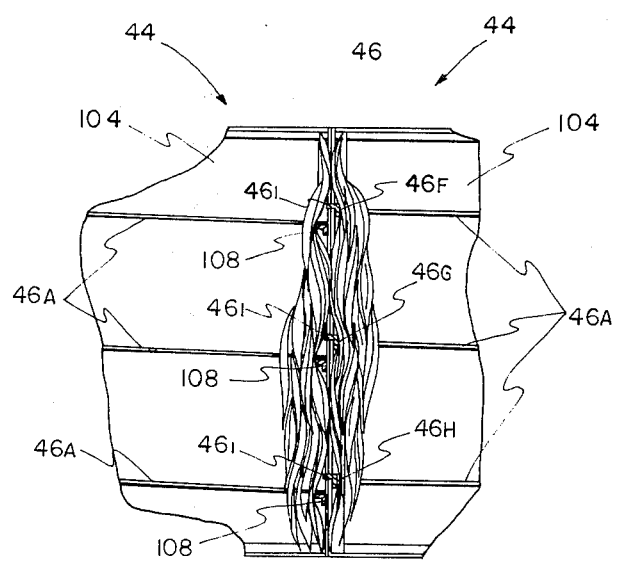
Figure 14:
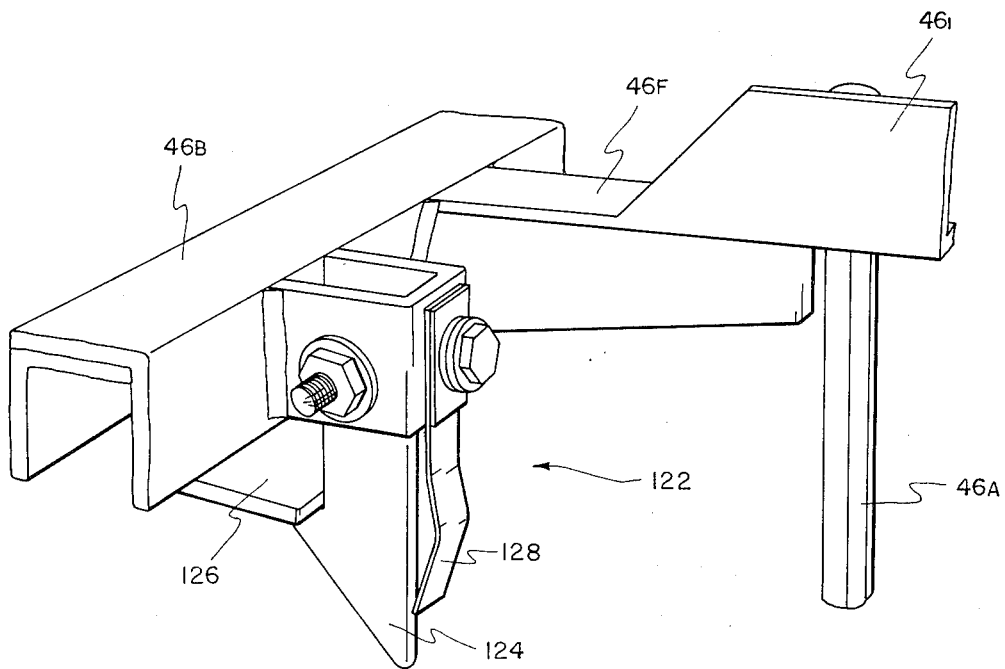
Figure 15:
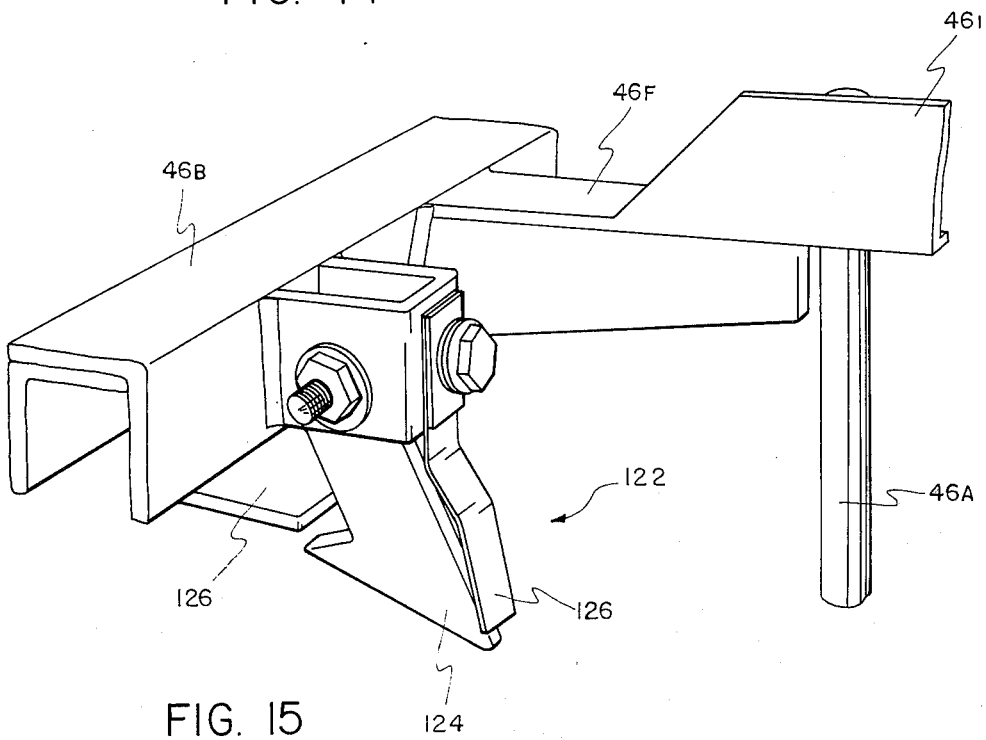
Figure 16:
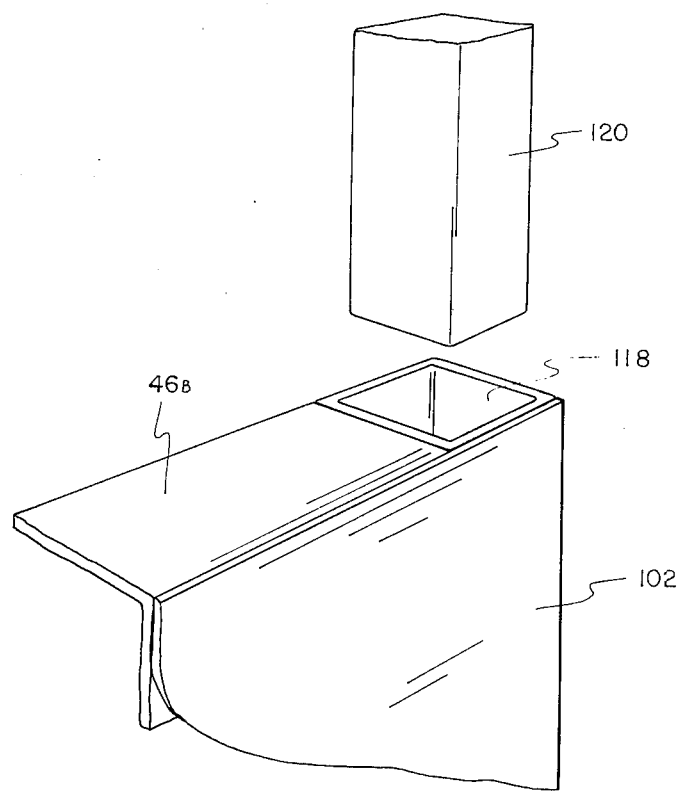
FIG. 16 is a fragmentary perspective view of a guide arm and guide arm receiving sleeve associated with the bulk handling unit and used in aligning the separable tine assembly with the base portion of the unit.

With further reference to FIGS. 10 and 11 and the bulk handling unit 44 after rotation, it is seen that the tine support members 46F, 46G and 46H all include an outwardly projecting side or flange 46I that projects outwardly from the tine assembly 46. The outwardly projecting side or flange 46I is preferably beveled inwardly from the opposite outer sides (as illustrated in FIGS. 14 and 15) such that when a preceding bulk handling unit is placed adjacent thereto, as viewed in FIG. 13, the projecting sides or flanges 46I extend into the back side 112 of the preceding unit. Therefore, it is seen that the flanges 46I generally overlie respective back tine support members 108 and cooperate therewith to generally form an air seal at the interface of any two adjacent units, which tends to prohibit air from moving upwardly between respective adjacent bulk handling units 44. FIG. 12 illustrates the tobacco blousing effect that is present as any two units come together, and FIG. 13 further illustrates the effect realized when two units are placed in front-to-back relationship and in close proximity to each other.

As pointed out above, the former front lateral side 110 becomes the bottom of the bulk handling unit 44 after rotation. The presence of the border strips 116 tends to vary the quantity of air flow through the unit with respect to the cross sectional area thereof. More particularly, the presence of the border strips 116 assures that a greater quantity of air is directed towards the central or greater density area of the unit than to the outer less dense areas. This tends to prohibit the outer less dense areas from curing and drying prior to the central more dense areas of the unit, in which case the resistance to air flow is greatly decreased around these outer sides and the air is prone to by-pass the more densely packed central area of the unit resulting in the tobacco in this area not being completely cured and dried.

Figure 18:
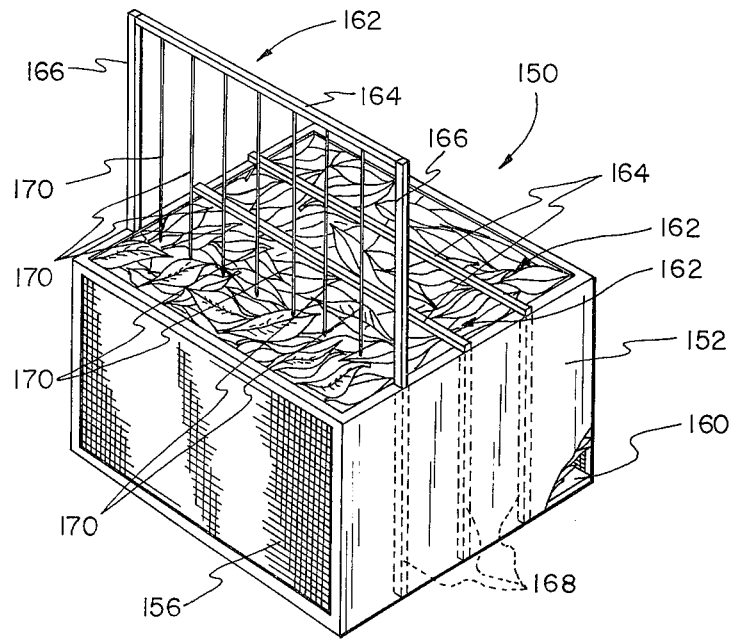
FIG. 18 is a perspective view of an alternate design for the bulk handling unit of the present invention, the alternate design shown herein being disposed in the filling position.
Figure 19:
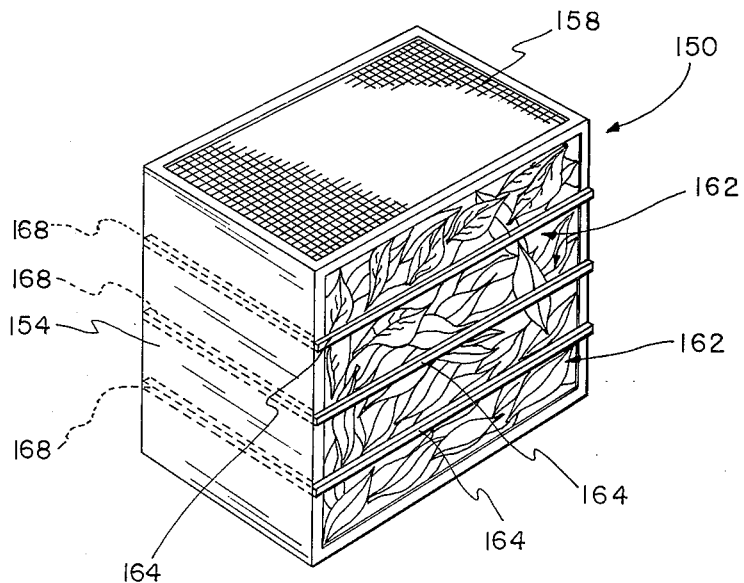
FIG. 19 is another perspective view of the alternate bulk handling unit of FIG. 18, the alternate design shown herein being rotated approximately 90 degrees from the filling position to a vertical position.

FIGS. 18 and 19 show an alternate embodiment for the bulk support unit of the present invention, the alternate embodiment being indicated generally by the numeral 150. The bulk support unit 150 is basically and fundamentally similar to the bulk support unit 44 shown in FIGS. 10 and 11 and may be utilized in the method of harvesting in the same manner illustrated in FIGS. 1–9. Both the bulk support unit 44 and the alternate embodiment 150 in the rotated position, as illustrated in FIGS. 11 and 19, respectively, are designed to support a continuous volume of bulk material in which the vertical depth thereof is greater than the length of the respective leaves comprising the volume.

Turning to the alternate bulk support unit 150, it is seen that the same is of a general box frame type construction and includes a pair of imperforated sides 152 and 154. (Sides 152 and 154 may be provided with stub axle shafts such as illustrated in FIGS. 3–5 for the purpose of rotation.) Extending between respective ends of the sides 152 and 154 is a pair of perforated sides 156 and 158 constructed of expanded metal or the like. Enclosing the back of the alternate bulk support unit 150 is a bottom imperforated back 160 that extends in a plane generally perpendicular to the plane of the sides 152, 154, 156 and 158.

The alternate bulk support unit 150 is designed to function in the same manner and in the same way as the bulk support unit 44 illustrated in FIGS. 10 and 11, and only differs therefrom in details of construction. In this regard, the alternate embodiment 150 is shown in FIG. 18 and is oriented therein in the filling position. To confine the leaves within the bulk support unit 150 in order that the unit may be rotated approximately 90° to the position illustrated in FIG. 19, a plurality of tine frames indicated generally by numeral 162 is provided. Each tine frame includes a transverse bar 164 and a pair of guide arms 162 fixed to the respective ends thereof and extending therefrom, the guide arms being adapted to be received by guide arm receiving channels 168 formed in each imperforated side 152 and 154. Fixed to the transverse bar 164 between the guide arms 166 is a plurality of tines 170 that are generally co-planar with the plane of the guide arms 166. To confine the leaves within the bulk support unit 150, the tine frames 162 are pressed downwardly through the bulk volume of tobacco contained within the support unit 150 with the tines 170 extending in directions generally perpendicularly to the planes of the leaves comprising the volume. Once pressed to a position where the tines 170 extend through the volume of tobacco, the tine frames 162 may be held to the bulk support unit 150 by a latching mechanism similar to that illustrated in FIGS. 14 and 15 or other suitable retaining means.

After the tines 170 have been inserted through the bulk volume of tobacco, it then follows that the bulk support unit 150 can be rotated approximately 90° from the filling position of FIG. 18 to the upright vertical position shown in FIG. 19. As seen in FIG. 19, after rotation, the imperforated sides 152 and 154 still remain as vertical sides of the alternate embodiment 150, while the perforated sides 156 and 158 are now disposed such that they assume top and bottom horizontal positions. Therefore, in the rotated position, air can readily move up through the bulk volume of tobacco within the support unit 150 since the leaves are generally disposed in vertical planes and since the top and bottom of the support unit 150 is perforated.

The real essence of the present invention is perhaps best illustrated in FIG. 11 whoch shows the front portion of a bulk handling unit 44 after rotation. As can be seen therein, bulk handling unit 44 includes a continuous volume of bulk tobacco therein in which the vertical depth VD is greater than the respective length of the leaves comprising the volume. Expressed in another way, the bulk handling unit is designed and adapted to accommodate a continuous vertical volume of tobacco leaf material in which the tobacco leaves are completely vertically integrated and are not disposed in spaced apart single tiers as with confentional bulk tobacco racks. Therefore, the present invention presents a bulk handling unit that is adapted to receive tobacco leaves such that their spacings and alignment may be random while the plane of the individual leaves remain oriented in general parallel alignment. It will be understood, however, by those skilled in the art that in the loose leaf handling of tobacco, especially with automatic harvesters, it is quite possible for leaves to occasionally be folded or creased to where the plane of the entire leaf does not lie parallel to adjacent leaves.

The terms "upper", "lower", "forward", "rearward", etc., have been used herein merely for the convenience of the foregoing specification and in the appended Claims to describe the method of harvesting tobacco and apparatus for bulk handling the harvested tobacco and its parts as oriented in the drawings. It is to be understood, however, that these terms are in no way limiting to the invention since the method of harvesting tobacco and apparatus for bulk handling the harvested tobacco may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range as intended to be embraced herein.

What is claimed is:

1. A bulk tobacco support structure for containing and supporting a bulk volume of tobacco and adapted to receive tobacco leaves in a first filling position and to support a continuous vertical volume of tobacco leaves of a vertical distance substantially greater than the length of the respective leaves comprising the volume of tobacco therein in a second 90° rotated drying position, said bulk tobacco support structure as oriented in said rotated drying position comprising: a container-type tobacco support structure for holding and supporting a volume of randomly aligned tobacco leaves wherein the leaves in said rotated position are generally disposed in vertical planes and the vertical height of said volume of leaves being substantially greater than the length of the respective leaves comprising the volume, said container including a back of a substantial cross sectional area with both the height and width of said back being substantially greater than the length of the respective tobacco leaves comprising the volume of leaves therein; a pair of laterally spaced side members extending from said back with the respective side members being disposed in generally parallel relationship; top and bottom areas defined between said laterally spaced side members, said top and bottom areas being at least partially open in order that air may pass therethrough; tine frame means detachably secured about one edge of said side members and longitudinally spaced relative to said back; elongated tine means supported at one end by said tine frame means and extending therefrom through the volume of tobacco leaves within said container for supporting the continuous volume of vertically integrated tobacco leaves within the container wherein the height of the vertically integrated volume of tobacco leaves is substantially greater than the length of the respective leaves comprising the volume; and vertically spaced tine support means remotely spaced from said tine frame means and disposed across said container for supporting said tine means projecting through the volume of tobacco within said container.

2. The bulk tobacco support structure of claim 1 wherein said detachably secured tine frame means includes a plurality of spaced apart tine support bars that extend substantially across the width of said bulk tobacco support structure when oriented in said rotated drying position.

3. The bulk tobacco support structure of claim 2 wherein said tine frame means further includes a frame structure interconnecting respective ends of said tine support bars such that said tine support bars are integrally constructed with said frame structure.

4. The bulk tobacco support structure of claim 3 wherein said tine frame means is provided with a series of guide arms that extend therefrom, said guide arms of said tine frame means being adapted to align with a series of guide arm receiving means formed about said bulk tobacco support structure such that said tine frame means may be properly positioned and placed about said bulk tobacco support structure by inserting said guide arms of said tine frame means into said guide arm receiving means associated with said bulk tobacco support structure and moving said tine frame means toward said bulk tobacco structure until said tine frame means is properly disposed and secured about said bulk tobacco support structure.

5. The bulk tobacco support structure of claim 1 wherein said tine support means comprises a plurality of vertically spaced cross members that extend transversely across the back of said bulk tobacco support unit when the bulk tobacco support unit is in the rotated drying position.

6. The bulk tobacco support structure of claim 5 wherein said back of said bulk tobacco support structure as oriented in the rotated drying position is of a generally open construction including open areas above and below certain tine support cross members extending across said back.

7. The bulk tobacco support structure of claim 6 wherein the respective containers are adapted to be longitudinally aligned during the drying operation with the respective backs of each being adapted to be disposed juxtaposed to the front tine frame means of an adjacent container, and wherein each container is provided with projecting seal means for projecting across the planar interface between adjacent containers and into the plane of an adjacent respective container for creating a sealed relationship between any two adjacent containers for generally prohibiting air from moving vertically betwen adjacent container.

8. The bulk tobacco support structure of claim 7 wherein said tine frame means includes a series of spaced apart tine bars, and wherein said tine support means includes a series of spaced apart tine support members extending across the back of said bulk tobacco support structure in general parallel relationship with said tine bars of said tine frame means when said bulk tobacco support structure is disposed in said drying position, and wherein said seal means for projecting across the planar interface between adjacent containers when properly aligned in front-to-back relationship includes flange means extending outwardly from said tine bars such that when said containers are disposed closely adjacent each other in said drying position, said flange means project outwardly across the planar interface between adjacent containers and into the plane of an adjacent respective container with the flange means projecting closely adjacent a respective tine support cross member extending across the back of said bulk tobacco support structure thereby generally prohibiting air from moving vertically between respective adjacent containers.

9. The bulk tobacco support structure of claim 1 wherein said container is of a rectangular parallelepiped type of construction, and wherein said laterally spaced side members are imperforated and extend generally completely along opposite sides of the rectangular parallelepiped type of containers such that when said container is filled with tobacco and oriented in said drying position said imperforated side member enclose said container about the outer side areas thereof such that air directed through said container during drying is prohibited from moving laterally from said container through the side areas occupied by said imperforated side members.

10. The bulk tobacco support structure of claim 9 wherein said detachably secured tine frame means comprises a generally rectangular frame structure having a series of spaced apart tine support bars extending across said rectangular frame structure, each tine bar adapted to support one end of said tine means when said tine means extend through the volume of bulk tobacco contained within said container.

11. The bulk tobacco support structure of claim 10 wherein said container is provided with a pair of laterally spaced stub axle shafts, each stub axle shaft being secured about one side of said container outwardly of a respective imperforated side member and extending outwardly therefrom such that said entire container may be supported and lifted by engaging said stub axle shafts with a lifting mechanism.

12. The bulk tobacco support structure of claim 1 wherein said bottom and top areas of said container when oriented in said drying position includes perforated side members with openings therein that allow air to move therethrough and through said container during the curing and drying process.

13. The bulk tobacco support structure of claim 1 wherein said container includes baffle means disposed about certain outer areas of the lower portion of said container, when said container is oriented in said drying position, for generally restricting air from entering the lower portion of said container about the areas occupied by said baffle means and thusly inducing air to enter the bottom area of said container inwardly of said baffle means, whereby said baffle means generally tends to increase the relative quantity of air entering the central area of said container as contrasted to the side areas thereof that generally overlie said baffle means.

14. A bulk tobacco support structure for containing and supporting tobacco leaf material during a curing and drying operation comprising: a box-type tobacco leaf container structure that as oriented in a first filling position includes, a bottom area of substantial cross sectional area with both the length and width of the cross sectional bottom area being substantially greater than the length of the respective tobacco leaves that are received and contained within the support structure; a pair of laterally spaced side members extending generally upwardly from said bottom area along opposite sides of said bottom area; front and rear side areas defined between said laterally spaced side members, said front and rear side areas being at least partially open in order that air may pass therethrough; an open top area defined about said box-type container for receiving tobacco leaves therethrough such that a volume of randomly aligned tobacco leaves may be received and contained within said generally box-type tobaccoo leaf container structure; tine frame means adapted to be positioned and held about said open top area after the box-type tobacco leaf container has been filled, said tine frame means adapted to support one end of a series of tine means that are adapted to penetrate and extend downwardly through said volume of tobacco leaves held within said generally box-type tobacco leaf container such that the tobacco leaves therein are held generally relatively stationary upon rotating said box-type container from said first filling position generally 90° to a second rotated drying position where said former front and rear at least partially open side areas become the top and bottom portions of the box-type tobacco container structure; and wherein said box-type tobacco leaf container structure is provided with baffle means about a plurality of outer side areas of the at least partially open side area that normally assumes the bottom portion of said box-type structure when the same is in said second rotated drying position for restricting air from entering the entire cross sectional area of said box-type tobacco leaf structure such that said baffle means generally tends to increase the relative quantity of air passing through the central areas of said box-type container structure as contrasted to the side areas thereof that generally overlie said baffle means.

15. The tobacco support structure of claim 14 wherein said baffle means comprises a plurality of imperforated strips disposed about the outer edge portion of the at least partially open side area that normally assumes the bottom portion of said boxtype tobacco leaf container when rotated to said second drying position, and wherein said imperforated strips are so disposed such that they at least run adjacent the adjacent edges of said laterally spaced side members.

16. A tobacco support structure for supporting a volume of tobacco leaves within a drying structure wherein said volume of tobacco leaves as supported during drying includes randomly aligned leaves generally disposed in vertical planes with the volume being made up of a continuous vertical volume of tobacco leaves of a vertical height substantially greater than the length of the respective leaves comprising the volume, said tobacco support structure, as oriented after filling and in the drying position, comprising: a self-standing box-type container that generally encompasses the total side areas of said volume of tobacco leaves within the support structure and supports said volume of tobacco, said self-standing box-type container including, two laterally spaced side frame means disposed adjacent the outer vertical sides of said volume of tobacco and generally extending about the entire volume of tobacco from the bottom portion thereof to the top thereof; back means extending across the back of said volume of tobacco between said laterally spaced side frame means for generally confining the volume of tobacco about the back side of said self-standing box-type container; top and bottom areas defined between said laterally spaced side frame means, said top and bottom areas being at least partially open in order that air may pass therethrough; tine frame means detachably secured to a side of said tobacco support structure opposite said back confining means and extending across the side of the volume of tobacco generally between said laterally spaced side frame means; a plurality of tine means supported at one end of said tine frame means and extending therefrom through said volume of tobacco leaves for supporting said continuous vertical volume of tobacco leaves from the general bottom portion to the general top portion of said self-standing box-type container; and said tobacco support structure including lower base support means on the lower portion of said self-standing box-type container for supporting said box-type container and the volume of tobacco leaves therein in an upright manner whereby said self-standing box-type container and the volume of tobacco supported therein can be supported about the lower portion thereof by underlying support structure.

17. A bulk tobacco support structure for containing and supporting tobacco leaf material during a curing and drying operation comprising: a box-type tobacco leaf container structure that as oriented in a first filling position includes, a bottom area of substantial cross sectional bottom area with both the length and width of the cross sectional bottom area being substantially greater than the length of the respective tobacco leaves that are received and contained within the support structure; a pair of laterally spaced imperforated side member means extending generally upwardly from said bottom area along opposite sides of said container adjacent the entire mass of tobacco held within said box-type container structure for restricting air movement laterally from said box-type container about the sides thereof occupied by said imperforated side member means; front and rear side areas defined between said laterally spaced side members, said front and rear side areas being at least partially open in order that air may pass therethrough; an open top area defined about said box-type container for receiving tobacco leaves therethrough such that a volume of randomly aligned tobacco leaves may be received and contained within said generally box-type tobacco leaf container structure; tine frame means adapted to be positioned and held about said open top area after the box-type tobacco leaf container has been filled, said tine frame means adapted to support one end of a series of tine means that are adapted to penetrate and extend downwardly through said volume of tobacco leaves held within said generally box-type tobacco leaf container such that the tobacco leaves therein are held generally relatively stationary upon rotating said box-type container from said first filling position generally 90 degrees to a second rotated drying position where said former front and rear at least partially open side areas become the top and bottom portions of the box-type tobacco container structure; and tine support means associated with said box-type tobacco leaf container for supporting said series of tine means at points remotedly from where said tine frame means supports said tine means.

* * * * *